(12) United States Patent
Carriere Lluch

(10) Patent No.: US 10,945,814 B2
(45) Date of Patent: *Mar. 16, 2021

(54) ORTHODONTIC SYSTEMS AND METHODS

(71) Applicant: ORTHODONTIC RESEARCH AND DEVELOPMENT, S.L., Barcelona (ES)

(72) Inventor: Luis Carriere Lluch, Barcelona (ES)

(73) Assignee: ORTHODONTIC RESEARCH AND DEVELOPMENT, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,411

(22) Filed: Jun. 11, 2020

(65) Prior Publication Data

US 2020/0297460 A1 Sep. 24, 2020

Related U.S. Application Data

(63) Continuation of application No. 16/642,352, filed as application No. PCT/EP2018/073349 on Aug. 30, 2018.

(30) Foreign Application Priority Data

Aug. 31, 2017 (EP) ..................................... 17382591

(51) Int. Cl.
*A61C 7/08* (2006.01)
*A61C 7/36* (2006.01)

(52) U.S. Cl.
CPC . *A61C 7/08* (2013.01); *A61C 7/36* (2013.01)

(58) Field of Classification Search
CPC ..................................... A61C 7/08; A61C 7/36
See application file for complete search history.

(56) References Cited

U.S. PATENT DOCUMENTS

| 4,708,646 | A | | 11/1987 | Jasper | |
| 5,066,226 | A | * | 11/1991 | Summer | A61C 7/36 433/19 |
| 5,752,823 | A | | 5/1998 | Vogt | |
| 7,802,987 | B1 | * | 9/2010 | Phan | A61C 7/00 433/24 |
| 2009/0098500 | A1 | | 4/2009 | Rendon | |
| 2010/0075268 | A1 | | 3/2010 | Von Arx | |
| 2014/0335468 | A1 | * | 11/2014 | Dickerson | A61C 7/36 433/19 |

(Continued)

FOREIGN PATENT DOCUMENTS

| EP | 1433435 A2 | 6/2004 |
| EP | 1649824 A1 | 4/2006 |
| WO | WO 2016/042393 A1 | 3/2016 |

OTHER PUBLICATIONS

International Search Report issued for PCT Application No. PCT/EP2018/073349, 4 pages.

(Continued)

*Primary Examiner* — Heidi M Eide
(74) *Attorney, Agent, or Firm* — Squire Patton Boggs (US) LLP

(57) ABSTRACT

Orthodontic systems and methods involving segmentary shells are disclosed. Examples of the systems and methods are particularly focused on applying a distalization force to a segment of teeth in a posterior lateral sector.

10 Claims, 7 Drawing Sheets

(56) References Cited

U.S. PATENT DOCUMENTS

| | | |
|---|---|---|
| 2015/0079531 A1 | 3/2015 | Heine |
| 2015/0216627 A1 | 8/2015 | Kopelman |
| 2016/0128803 A1* | 5/2016 | Webber .................... A61C 7/36 433/6 |
| 2017/0007365 A1* | 1/2017 | Kopelman ............... A61C 7/08 |

OTHER PUBLICATIONS

Written Opinion of the International Searching Authority issued for PCT Application No. PCT/EP2018/073349, 9 pages.

* cited by examiner

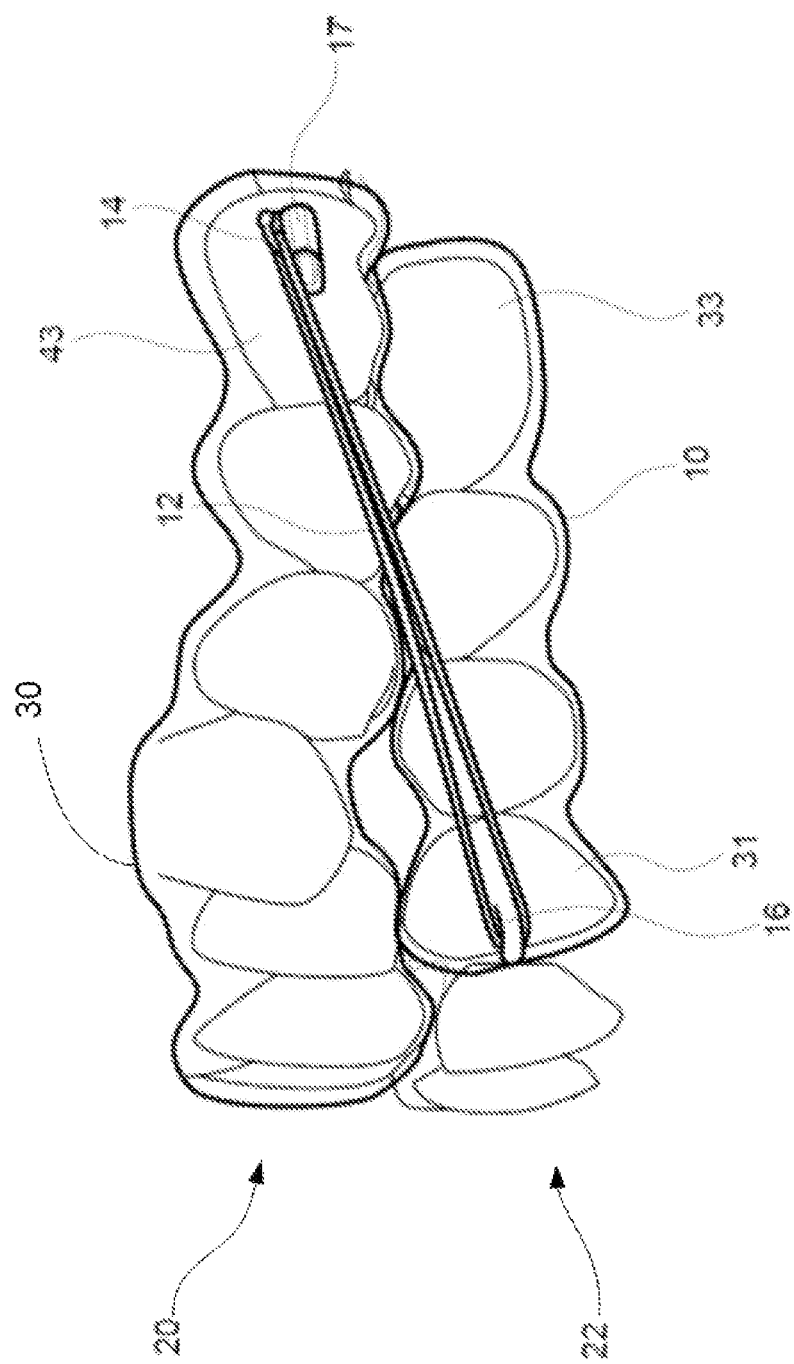

ORTHODONTIC SYSTEMS AND METHODS

This application is a continuation of application Ser. No. 16/642,352, filed Feb. 26, 2020, which is a 35 U.S.C. 371 filing of International Application No. PCT/EP2018/073349, filed on Aug. 30, 2018, which claims priority to and the benefit of European Patent Application No. EP 17382591.0, filed on Aug. 31, 2017, all of which are incorporated verbatim herein by reference in their entirety, including the specifications, drawings, and the claims.

The present disclosure relates to orthodontic systems and methods, and more particularly relates to orthodontic systems and methods using distalizing forces applied to a segment of teeth. The present disclosure further relates to removable segmentary shells.

BACKGROUND

The correction of dental irregularities and malocclusions by applying controlled forces to the teeth has become commonplace. One of the most important aims for orthodontics is to arrange space for teeth in the jaw in such a manner that the teeth can be positioned properly and they can contact each other in their desired positions.

So-called aligners commercialized under the name Invisalign® and under other names have become popular due to its pleasant design as compared to traditional brackets. The treatment with aligners includes designing a treatment path for a complete arch of teeth, wherein the teeth undergo a movement from the original position to a final desired position. Then, a number of consecutive intermediate positions in between the original and the final position for the teeth are determined, including movements of teeth that may include rotation about a root, torsion, in-out displacement, and mesial-distal displacement. A series of shells (dental splints) is then provided to the patient. These shells correspond to the arch of teeth in their intermediate positions. The shells apply corrective forces to the arch of teeth (when fitted onto the teeth), because the shell is shaped according to the next intermediate position. Each of the shells is used during a period of time, e.g. one or a few weeks. Once the teeth have assumed the desired position, a shell corresponding to the next intermediate position is to be fitted. This process goes on until ultimately, the teeth reach their final desired position.

Some attempts have been made to improve these appliances. For example, US 2010/0075268 A1 discloses a splints system including acrylic working platforms and prefabricated elements constituted by a wire with a central part that may have protuberances, loops and/or creases and undulated retention areas. The splints and the working platforms are passive, i.e. the splints by themselves do not apply corrective forces to the teeth. One disadvantage related to this prior solution is that the splints cannot be removed by a user. The acrylic working platforms are connected to the splints, and these cannot be removed without intervention by a professional.

US 2016/0128803 A1 discloses an aligner that comprises two shell segments joined by a connector for covering corresponding teeth segments. This segmental aligner aims to isolate the forces between different teeth sets. However the segments are not in fact isolated, they are joined by a connector. Therefore there still exists an interaction between the segments, with load transfer, that reduces the effect of the corrective forces applied.

The connector in some embodiments is positioned on anterior teeth e.g. incisors in between the two shell segments. In other embodiments, the connector is a bridge-like connector of a semi-rigid material. The objective of the connectors appears to be to not transfer forces from one segment of teeth to another segment of teeth. However, even if in an initial stage the connector does not transmit forces from one segment to another, as soon as the segments are moved, the connector inevitably transmits forces from one segment to the other and/or to other teeth.

Such a transmission of forces reduces the efficiency of an orthodontic treatment of the segment of teeth. A segment of teeth is herein defined as a group of neighbouring teeth, i.e. two or more neighbouring teeth. Distalization of the segment of teeth relates to moving a group of teeth together. In particular, in the present disclosure distalization refers to moving a group of teeth in the distal direction of the mouth. The group of teeth may be located in the upper jawbone (maxilla) or in the lower jawbone (mandible).

A particular distalizing element is known from e.g. EP 1 433 435 and EP 1 649 824. These distalizers are especially adapted for the segmental distalization of the canine-to-molar posterior maxillary area. The distalizers of these documents comprise a mesial element which may be fixed by its base to an upper canine, and further comprises a distal element which may be fixed by its base to an upper molar, in particular the first molar.

The mesial element in these designs comprises both a base, and an arm that connects it to the distal element. The arm may be substantially arch shaped and may comprise a ball member at one of its ends. This ball member is received in a receptacle of the distal element that has a complementary shape to the ball member.

The mesial element may comprise a blunt projection that extends substantially forwards which may serve as a hooking element. In use, a bracket with a hook may be attached to a mandibular molar and an (orthodontic) rubber band may be suspended around this hook and the hooking element on the mesial element.

This way, a force pulling the maxillary canine backwards is provided. If the patient is wearing e.g. a splint (or another fixation device) that acts as a solid anchor and fixes the teeth of the mandible in position, it may be ensured that the teeth in the mandible do not move forwards, and that the maxillary canine is pulled backwards.

Due to the connection between the mesial element and the distal element of the distalizer, the maxillary molar may thus also be pushed backwards. At the same time, due to the shape of the arm in between the canine and the molar and due to the position of the distal element on the molar, a rotational force is also exerted upon the molar. This rotational force may result in a pivot about the palatal root of the maxillary molar. Also, a rotation in the distal direction of the molar ("uprighting") may result. Thus a backwards force and a rotational force may be exerted upon the molar at the same time.

In order to avoid that the maxillary molar rotates too much in the distal direction (i.e. in this case, it would assume an orientation in which it is tilted backwards), the shape of the receptacle and the ball member are such that with a predetermined rotation of the ball member with respect to the upper molar, the ball member touches the inside of the receptacle and cannot rotate further. To this end, both the mesial element and distal element are mounted at the right height on the molar and canine and are mounted substantially straight along the locally defined mandible-maxilla (straight up-down) direction on the surface of the tooth. The arm is provided at a predefined angle with respect to the ball member. When both the canine and molar are actually straight, this angle will make sure that the ball member or the arm of the mesial element touches the border of the receptacle and cannot rotate further.

Similarly, the shape of the ball member and the border of the receptacle may be such that a rotation of the upper molar around its palatal root is limited. Once a predetermined rotation is reached, the arm may touch the border of the receptacle and the ball member is not able to rotate further.

It may thus be ensured that a distalization of the canine-molar segment may be combined with a proper (re)orientation of the set of teeth in the maxillary posterior region.

One drawback related to these prior art distalization devices is that they cannot be mounted in the mandible of many patients, because there is not sufficient space available between molar in the mandible and an inside of a cheek of a patient. Also, when such a distalization device is mounted on a molar in the mandible, a molar in the maxilla could enter into collision with the distalization device.

A further drawback related to these prior art distalization devices is that their ability to adapt for torsion along the arm of the mesial element is limited. Torsion along the arm may occur because e.g. a molar is inclined inwards (i.e. in the lingual direction) with respect to the canine/premolar to which the mesial element is attached. In these cases, it is not always possible to correctly position the distalization device.

Moreover, also these distalization devices are cemented on the teeth of a patient, and so cannot be easily removed by a patient or user in a private setting.

There exists a need for a segmental distalization device that at least partially reduces some of the aforementioned drawbacks.

SUMMARY

In a first aspect, an orthodontic system is provided, which comprises a removable segmentary shell for being fitted on a segment of teeth in a posterior lateral sector, the segment of teeth comprising between two and six adjacent teeth and extending from a canine or premolar to a premolar or molar and a resilient traction element. Either the segment of teeth or the removable segmentary shell comprises a labial retention feature configured to be coupled with the resilient traction element and the orthodontic system is configured to apply distal forces to the segment of teeth, without transferring the distal forces to other teeth outside the segment.

The malocclusion treatments using the segmented appliance of the present disclosure is able to provide a faster result than other methods. It is configured to apply a corrective distal force to a teeth segment in isolation, which allows focusing the corrective efforts on the segment of teeth, making the treatment efficient and free of competitive forces. Patients can observe a faster evolution than with shells or aligners that cover the complete dental arch and the unpleasant feeling of wearing an orthodontic device for the duration of a treatment can be reduced to a minimum.

A shell herein may be understood as a covering that envelops either a segment of teeth (segmentary shell) or a complete arch of teeth (complete shell). In orthodontics, these types of shells may also be called aligners, or orthodontic splints. These terms are used interchangeably herein.

A segmentary shell herein may be regarded as a shell element that covers only a segment of teeth, rather than a complete arch of teeth of either the mandible or maxilla.

A complete shell herein is to be regarded as a shell element that covers a complete arch either of the maxilla or of the mandible. As will be explained later, by covering a complete arch with a shell, the reaction force from distalization of the segmentary shell can be absorbed while fixing the arch with respect to the jaw, i.e. without the arch moving mesially.

The shell may be made from a variety of materials, but for aesthetic aspects is preferably made from a substantially transparent or translucent polymer. The shell might however be provided with any color or with any desired pattern printed on the shell.

Moreover, since the shell is removable, and the traction element (which can be an elastic or rubber band) can be intermaxillary, a user can easily remove the traction element and the shell without the need for intervention from a healthcare professional. This may improve user satisfaction as, during specific social events, a user might temporarily prefer not to wear or show orthodontic appliances.

Intermaxillary in the present disclosure means that it extends between the mandible and the maxilla. I.e. the traction element may apply a distal force on a segment of teeth in the mandible by being tensioned between an anchor in the maxilla and the segment of teeth/shell in the mandible. Alternatively, the traction element may be tensioned between a retention feature (e.g. a hook) bonded on the teeth/shell in the maxilla and an achor in the mandible.

The terms elastic band and rubber band are used interchangeably herein and are used to denote a loop of rubber (or other elastic material), that is ring shaped. The elastic band may extend from a first hook or protrusion (mounted with the segment of teeth) to a second hook or protrusion provided on an anchor. By elongating the elastic band to fit around the first and second hooks, the elastic band has a tendency to shorten and thereby provides a force to the first and second hooks. Instead of hooks, projections or protrusions around which an elastic band or other traction element could be fitted, other retention features that retain a traction element might be used. Retention may alternatively be achieved e.g. by clamping.

In some examples, the first hook (or other retention feature) may be formed or provided on the segmentary shell. In other examples, the first hook (or first retention feature) may be attached to a tooth of the segment of teeth, e.g. an attachment incorporating such a retention feature may be bonded to a surface of the tooth. In this case, the shell element may comprise an opening, window, recess or cut-out to provide space for the first hook or projection.

The second retention feature, e.g. a second hook may be provided on an anchor, which may be a bracket provided on a tooth outside of the segment of teeth being treated. The anchor may also be a Temporary Anchorage Device (TAD), e.g. mounted to bone structure. Both retention features are preferably provided on a labial side of the teeth for easy access for the user. Yet another possibility is that a second retention feature is provided on or integrally formed with (a labial side of) the complete shell in the jaw opposite to the jaw in which the segmentary shell is positioned.

In some examples, the segmentary shell may comprise a unilateral indent between two teeth of the segment, wherein the indent is oversized with respect to a space between the two teeth, such that the indent is compressed when the segmentary shell is positioned on the segment of teeth. When the indent is compressed by positioning the segment on the teeth, the indent will have a tendency to open. Such a force on one side of the segment can provide a moment to a molar which as a result can rotate around its palatal root.

In a further aspect, a method for treating a malocclusion is provided. The method includes fitting a shell to a segment of teeth in a posterior lateral sector, the segment of teeth comprising between two and six adjacent teeth and extending from a canine or premolar to a premolar or molar, and applying a distal force to the segment of teeth without transferring the distal force to other teeth outside the segment.

In some examples, the method may comprise providing a series of consecutive segmentary shells, fitting a first segmentary shell of the series of consecutive shells to the segment of teeth, applying the distal force to the segment of teeth with the first segmentary shell fitted on the segment of teeth for a first period of time, and replacing the first segmentary shell with a second segmentary shell of the series of consecutive shells to the segment of teeth and applying the distal force to the segment of teeth with the second segmentary shell fitted on the segment of teeth for a second period of time.

The series of consecutive segmentary shells can apply corrective distal forces to the segment of teeth, which are independent from the distalizing forces applied by an elastic band, i.e. these forces may be present if no elastic band or traction element is used. The treatment can be enhanced by the combination of these distalization forces of the segmentary shells and the traction element.

In some examples, the consecutive segmentary shells substantially do not apply corrective forces other than distal forces to canine or premolars. By concentrating the treatment on distalization and postponing any movement of canines and premolars in in-out direction, or involving rotation etc., in a first phase of treatment, a class II or class III malocclusion may quickly be treated to become a class I malocclusion. After such a first stage of treatment, a second stage of treatment using e.g. brackets or shells/aligners covering the complete dental arch may take place. By first reducing the class II or class III malocclusion of a class I malocclusion by focusing exclusively on distalization, a period necessary for the total treatment may be shortened for some patients.

A class I malocclusion may be defined as a malocclusion in which the molar relationship is normal, but the other teeth have problems like spacing, crowding, over or under eruption. A class II malocclusion may be defined as a situation, in which the mesiobuccal cusp of the upper first molar is not aligned with the mesiobuccal groove of the lower first molar. Instead it is anterior to it. In a class III malocclusion, the upper molars are placed not in the mesiobuccal groove but posteriorly to it.

In some examples, one or more segmentary shells of the series of segmentary shells are configured to apply a rotational force to a molar around a palatal root of the molar. The rotational force may be provided by an indent as discussed before, or by including in the series of consecutive segmentary shells a progressing rotational movement of the molar.

In some examples, the teeth segment treated may extend from a molar to a pre-molar. In some other examples, the teeth segment may extend from a canine to a molar. The molar may be a first molar, a second molar or a third molar.

In a further aspect, an orthodontic system is provided that comprises a segmentary shell configured to cover a segment of teeth in a posterior lateral sector of either a maxilla or a mandible, and a complete fixating shell configured to fit over an arch of teeth of the other of the maxilla and the mandible. The segmentary shell has a first surface and the complete fixating shell has a corresponding second surface, wherein the first surface comprises one or more first protrusions and the second surface comprises one or more second protrusions. And the first and second protrusions are shaped such that when the first and second protrusions enter into contact, the second protrusions provide a distalization force to the first protrusions.

In this aspect, an orthodontic system is provided in which no further traction elements are necessary. The contact between protrusions arranged on the segmentary shell on the one hand, and the protrusions arranged on the complete (fixating) shell provide the distalization force to the segmentary shell. The segment of teeth covered by the segmentary shell may thus undergo a distalization movement. The protrusions can be arranged on e.g. occlusal surfaces of the shells that face each other, but also on either the lingual or on the labial surfaces of the shells. The protrusions might also be arranged on more than one of these surfaces.

The normal ordinary movements from the mandible with respect to the maxilla throughout a day can provide repetitive contact between the protrusions. Every time, such a contact is established, a (small) distalization force is applied to the segmentary shell. As explained before, since the complete fixating shell covers a complete arch, the mesial force applied onto the complete shell does not result in a movement of a segment of teeth or the complete arch of teeth (with respect to the jaw) in the mesial direction.

The shells (segmentary and complete) may be shaped such as to fit substantially exactly over the corresponding teeth, including e.g. local irregularities on individual teeth of a patient. The shells may be based on e.g. a computer model of the teeth of a patient. To this model, then the suitably shaped protrusions can be added which are provided with the goal to come into contact with the protrusions on the other shell.

In some examples, the first protrusions may have a first sloping surface extending between a first base and a first top edge, the first top edge being located distally with respect to the first base. Similarly, in some examples, the second protrusions have a second sloping surface extending between a second base and a second top edge, the second top edge being located mesially with respect to the second base. These are examples of shapes of protrusions that can provide a distalization force on the segmentary shell.

"Top" herein may be understood as a portion closer to the opposing jaw. I.e. if the (segmentary or complete) shell is fitted in the maxilla, then the top of the shell is a portion that is closest to the mandible. If the shell is fitted in the mandible, then the top of the shell is a portion that is closest to the maxilla.

In some examples, the first sloping surface and the second sloping surface are substantially complementary to each other. In other examples, the shapes of the protrusions can be different.

In some examples, the segmentary shell (with protrusions) or the segment of teeth may furthermore comprise a first retention feature for receiving a first end of a resilient traction element, the orthodontic system further comprising an anchor for receiving a second end of the resilient traction element, wherein the first retention feature optionally is a hook. Even if the shells in this orthodontic system do not necessarily need a further traction element to provide a distalization force, such a traction element can provide an additional distalization force.

In some examples, the orthodontic system (with protrusions on the shells) comprises a series of consecutive segmentary shells, wherein the segmentary shells are configured to apply a corrective distal force to the segment of teeth, and wherein the consecutive segmentary shells of the series are shaped to correspond to consecutive positions of the segment of teeth in a desired treatment. The series of shells may be designed such that the first protrusions substantially maintain their positions. Alternatively, the first protrusions in consecutive shells may be in different positions. In some examples, the orthodontic system may further comprise a series of complete fixating shells with varying positions of second protrusions.

Also in the case of shells with protrusions, a series of segmentary shells corresponding to intermediate positions may be provided to provide additional distalization force and thus additional speed in the treatment. In order to ensure continued contact between the protrusions on the segmentary shell and the protrusions on the complete fixating shell, a series of complete fixating shells may also be provided. In the series of complete shells, the spaces corresponding to the teeth of the patient may stay substantially the same, but the positions of the protrusions may vary.

In a further aspect, a removable segmentary shell for being fitted on a segment of teeth in a posterior lateral sector of a maxilla is provided. The segment of teeth comprises between two and six adjacent teeth and extends from a canine or premolar to a premolar or molar. The segmentary shell comprises one or more protrusions having a sloping surface extending between a base, and a top edge, the top edge being located closer to the mandible than the base, wherein the top edge is located distally with respect to the base.

In yet a further aspect, a removable segmentary shell for being fitted on a segment of teeth in a posterior lateral sector of the mandible is provided. The segment of teeth comprises between two and six adjacent teeth and extending from a canine or premolar to a premolar or molar. The segmentary shell comprises one or more protrusions having a sloping surface extending between a base, and a top edge, the top edge being located closer to the maxilla than the base, wherein the top edge is located distally with respect to the base.

BRIEF DESCRIPTION OF THE DRAWINGS

Particular examples of the present disclosure will be described in the following by way of non-limiting examples, with reference to the appended drawings, in which:

FIGS. 2a-2c illustrates examples of segmentary shells and orthodontic systems comprising such segmentary shells;

DETAILED DESCRIPTION OF EXAMPLES

Figure 1A:
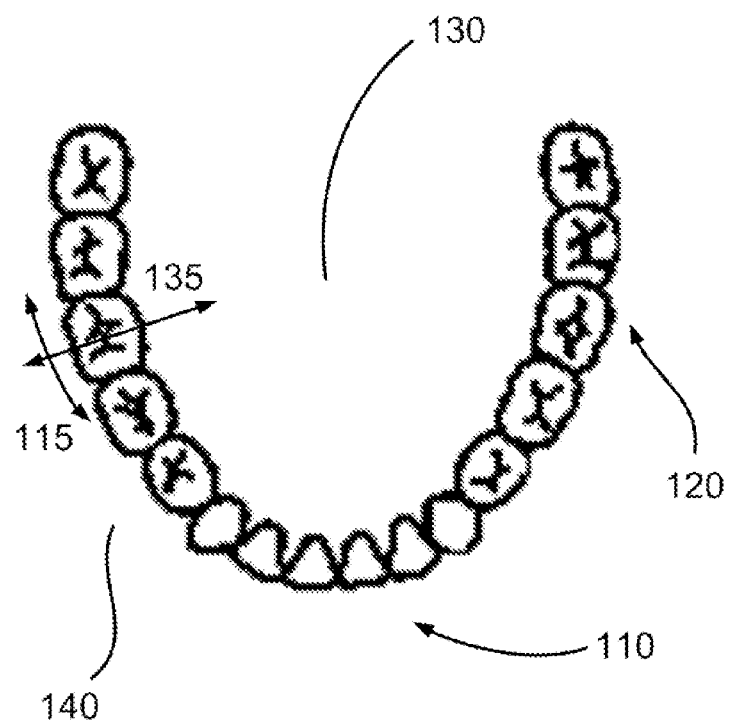
FIGS. 1a and 1b illustrate some of the terminology used herein.

The following description is merely exemplary in nature and is not intended to limit the present disclosure, application, or uses. It should be understood that throughout the drawings, corresponding reference numerals indicate like or corresponding parts and features.

FIG. 1a schematically illustrates the arrangement of teeth in the lower jaw (mandible). A front portion of the mouth 110 may be referred to as a mesial region. A rear portion of the mouth 120 may be referred to as a distal region. In orthodontics, mesial and distal are terms used to refer to something being respectively closer to and further away from a central midline of the arch of teeth.

An inner portion of the mouth behind the teeth 130 may be referred to as a lingual region (a region in which the tongue is located). An outer portion of the mouth 140 may be referred to as a labial region (a region in which the lips are located). A mesial-distal direction 115 with respect to a specific tooth (first molar) has been schematically indicated in FIG. 1. Also indicated in FIG. 1 is a lingual-labial direction 135 with respect to the same tooth. This terminology will be adhered to in the present disclosure.

Even though a mandible is illustrated in this particular figure, it should be clear that the same terminology applies to the maxilla.

Figure 1B:
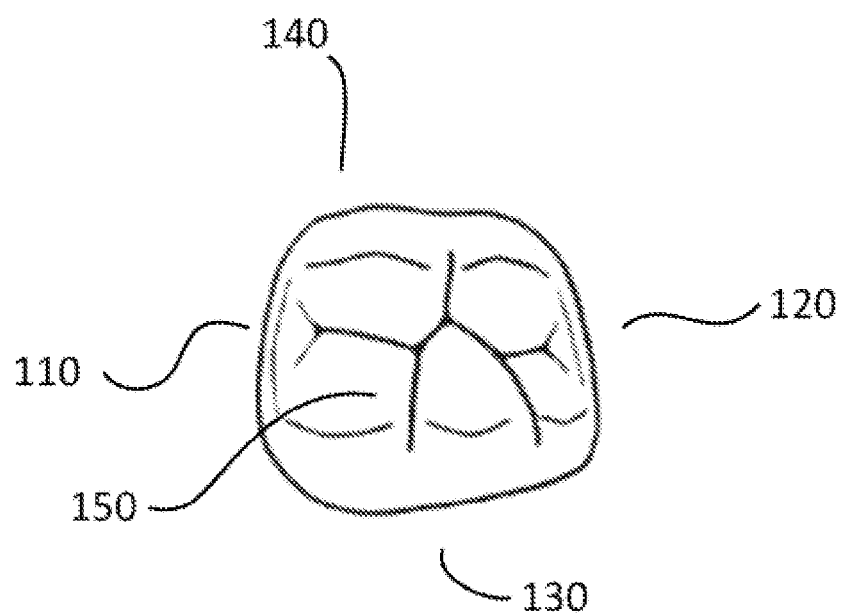

FIG. 1b schematically illustrates a molar. A mesial side of the molar is indicated by reference sign 110 (closer to a midline of the arch of teeth), whereas a distal side of the molar is indicated with reference sign 120 (further away from the midline). Reference signs 130 and 140 respectively indicate the lingual and labial sides (or surfaces) of the molar. Reference sign 150 indicates the occlusal surface of the tooth. An occlusal surface of a tooth in the maxilla (upper jaw) faces an occlusal surface of a tooth in the mandible and vice versa.

FIG. 2a illustrates an example of an orthodontic system. The system comprises a segmentary shell 10 for being placed on a teeth segment. The segment in this example extends from a canine 31 to a molar 33 in the mandible 22. The segmentary shell may be designed for each patient specifically, i.e. the shell may be manufactured to fit substantially exactly around a patient's teeth taking into account e.g. small irregularities on individual teeth and deviations of individual teeth. The shell may preferably be made of an elastic, semi-rigid or rigid transparent or translucent material.

The segmentary shell 10 in this example comprises a hook 16 on a labial surface of the shell. A rubber band may be fitted around this hook 16 and around a second hook 14. In this example, the second hook 14 may be provided on an attachment 17 in the complete fixating shell, the hook in this case being arranged close to a molar 43 in the maxilla 20. As the rubber band 12 is elongated, the rubber band applies a distalization force to the segmentary shell 10. Because the shell 10 encompasses the segment from the canine 31 to molar 33, the distalization is transmitted to the segment.

Figure 2B:
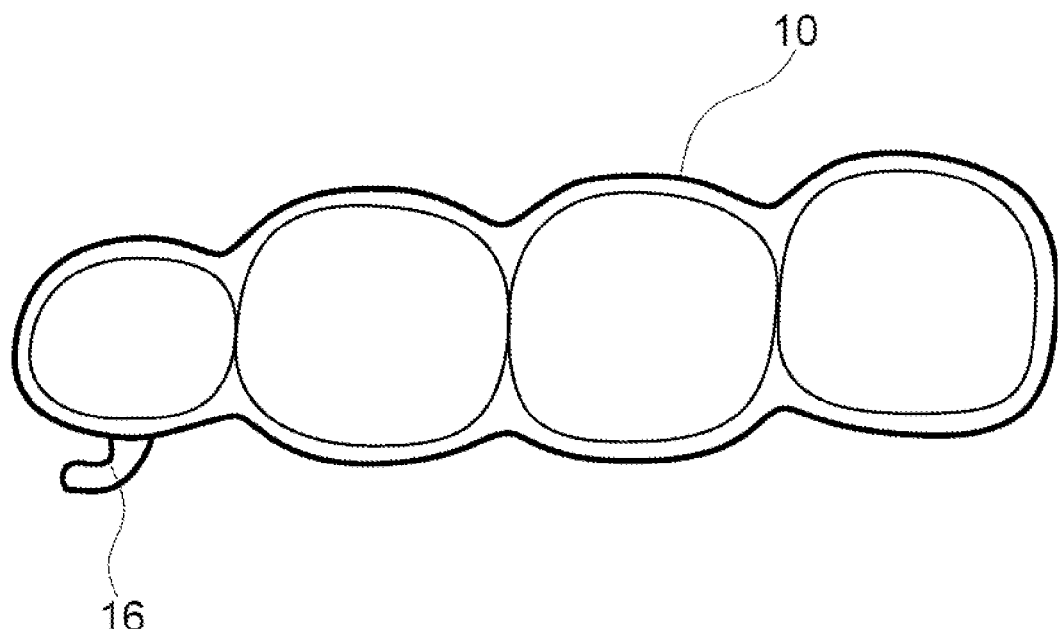

FIG. 2b schematically illustrates another view of the segmentary shell 10.

Particularly advantageous is the fact that the segmentary shell does not cover the complete dental arch, and that it is provided for only a teeth segment. There is no connection between the shell and anterior teeth or other teeth in the mandible. Thanks to this configuration, the appliance disclosed is able to focus the corrective forces on the misaligned teeth of the segment. This force concentration has the effect of providing faster results and the overall treatment time can therefore be reduced. Other attempts to provide orthodontic appliances in the form of shell elements covering a complete dental arch cannot provide results as quickly.

It is important to avoid force transfer between the segmentary shell and other portions of the same arch, or other segmentary shell elements used in the treatment, as they would exert a distorting negative influence in the applied corrective forces, and can partially or completely neutralize the intended correction, which can finally lead to a slowing down of the treatment.

At the same time, a mesial force is applied to the molar 43 in the maxilla. In order to avoid mesial movement of the molar 43 and other teeth in the maxilla, a complete fixating shell or splint that acts as an anchor to the maxillary teeth may be worn by a patient. This complete shell includes the entire arch of the maxilla (in this case) and extends from the distal side of the last molars to the mesial side of the anterior teeth. This way any forward movement of the teeth in the maxilla with respect to the maxilla can be avoided.

In the example of FIG. 2*a*, the segmentary shell is applied to a posterior segment in the mandible. However, in other examples the segmentary shell may be applied to a posterior segment in the maxilla. In this case, the anchor for the elastic band may be part of a bracket cemented on e.g. a molar or premolar in the mandible. And in that case, a shell covering the entire arch of the mandible may be provided so as to avoid movement in the mandible. This case is illustrated e.g. in FIG. 2*c*.

Figure 2C:
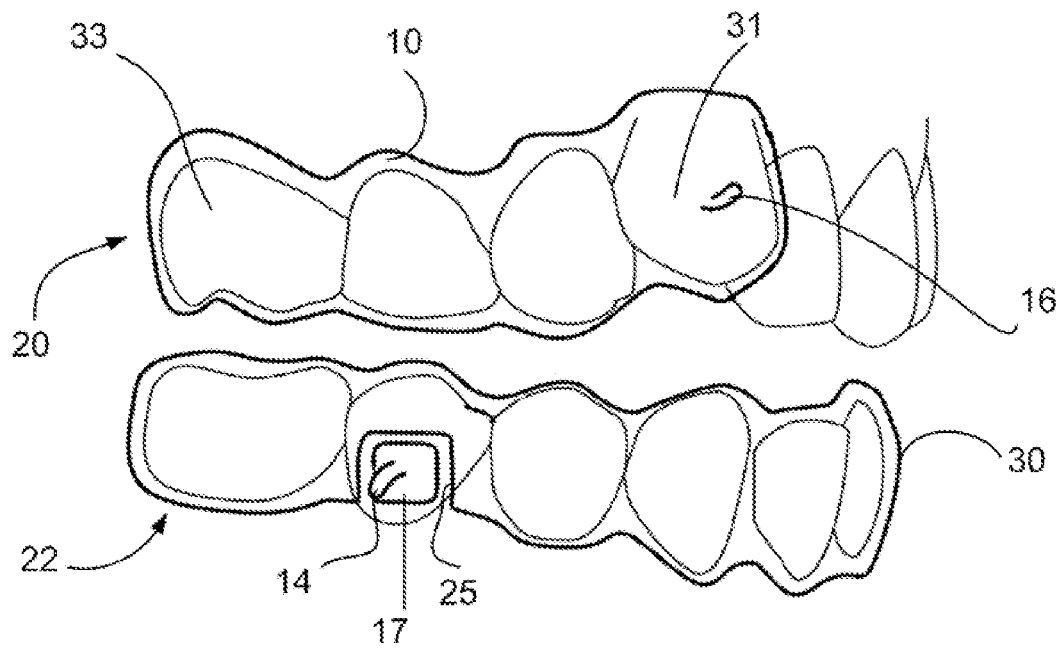

In FIG. 2*c*, the segmentary shell 10 in the maxilla 20 has a hook or protrusion on the segmentary shell. A resilient traction element may be disposed between first hook 16 and second hook 14. In the example illustrated in FIG. 2*c*, the complete fixating shell 30 has a cut-out 25 arranged with a premolar in the mandible 22. This premolar carries a bracket 17 with a second hook 14.

Other anchors such as TADs fitted to a bone may also be used in further examples. In the examples shown, the hook (or some sort of other projection or protrusion) may be part of the segmentary shell 10. In other examples, the hook may be attached to a tooth of the segment. The segmentary shell may comprise an opening, recess, cut-out or window through which the hook protrudes.

In the examples of FIGS. 2*a* and 2*c*, the hook is shown at the position of the canine, near a proximal end of the shell. In other examples, the hook may be provided e.g. midway along the length of the shell, either on the segmentary shell itself or on e.g. a premolar.

In some variations, the segmentary shell element may comprise different types of retention feature for being pulled by the elastic band. These shapes could be any suitable protrusion shaped such that an elastic band can be attached, such as for instance an L-shaped protrusion, a hook or hitch among others. Also a discontinuity like a cut, a flap, a strip or the like, would suffice for performing this function.

Figure 3A:
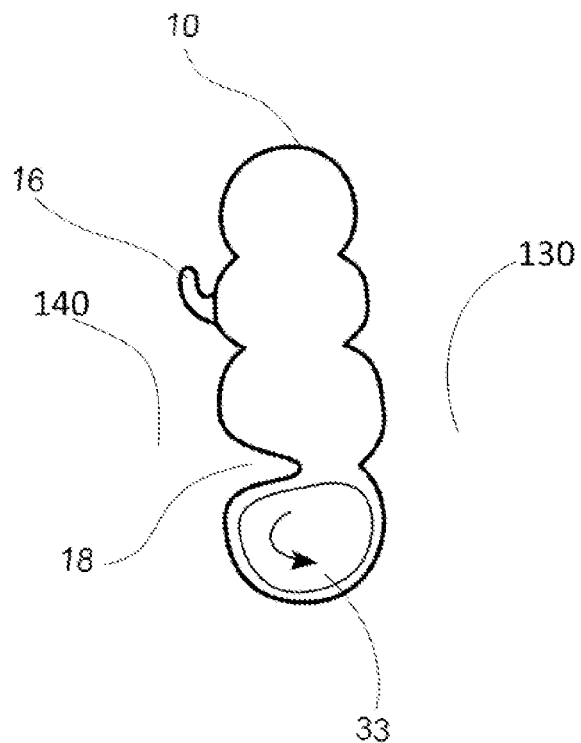
FIGS. 3a-3c illustrate further examples of segmentary shells which may be used in methods and systems as herein disclosed.

FIG. 3*a* schematically illustrates another example of a segmentary shell 10 adapted to be fitted over a segment of teeth, in particular a segment teeth in a posterior jawbone sector. The segmentary shell 10 may generally be similar to the shell 10 shown in FIG. 2.

In this example however, the shell comprises a unilateral indent 18 in a region between two teeth, in particular a molar 33 and a neighbouring tooth which may be another molar or premolar. The unilateral indent is provided on the labial side 140 of the segmentary shell. The indent may be shaped and sized slightly larger than the available space between the teeth. When the shell is fitted over the teeth, the indent is slightly compressed. In use, the indent thus has the tendency to open which applies a rotational force to molar 33 which as a result can pivot around its palatal root. The bottom of the indent thus has a hinge like function, enabling a movement of a posterior portion of the shell 10 with respect to a more proximal portion of the shell.

By choosing an appropriate indent shape and size it is possible to control the shell stiffness in this region and by designing the shell profile is possible to define the deformation necessary for positioning the aligner in the patient's teeth. The molar to which a rotational force may be applied may be a first molar.

Figure 3B:
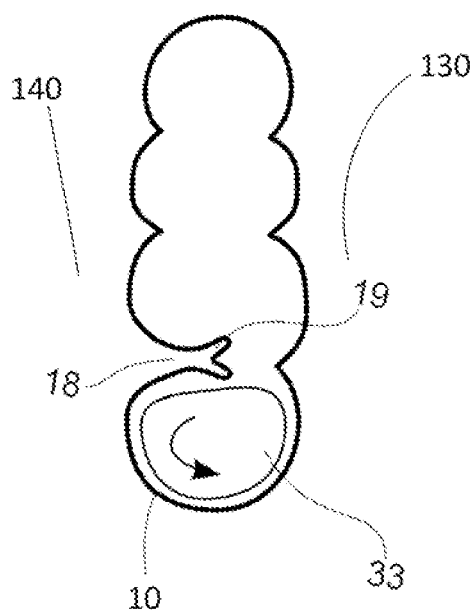

FIG. 3*b* shows another example of a shell configured to be fitted over a segment of teeth. The shell is similar to the shell shown in FIG. 3*a*. In this case, a bottom 19 of the indent may include further recesses extending slightly diagonally and slightly mesially. Such recesses weaken the shell and the hinge function of the indent may be adjusted in accordance with circumstances. In this figure (and in other figures), the segmentary shell is not shown with any sort of retention feature for retaining a traction element. It should be clear that in all such examples, such retention features may indeed be provided on the segmentary shell or on teeth covered by the segmentary shell.

Figures 3C, 4:
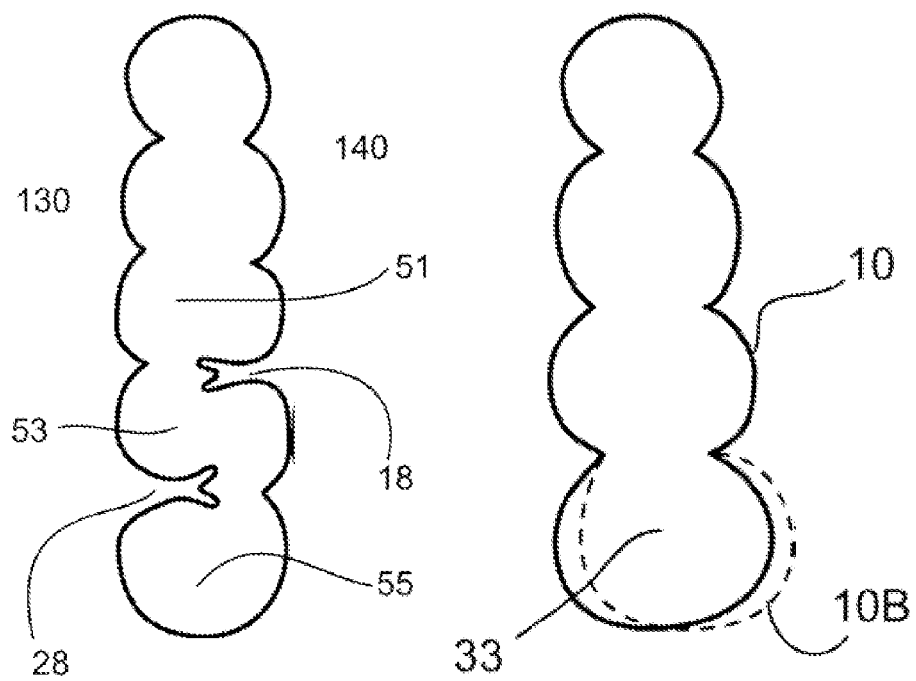
FIG. 4 schematically illustrates an example of a series of segmentary shells which may be used in methods and systems as herein disclosed.

FIG. 3*c* schematically illustrates another example of a segmentary shell. In this example the segmentary shell has a first indent 18 on a labial side 140 of the segmentary shell and a second indent 28 on a lingual side of the segmentary shell. In particular, the first indent may be arranged between a premolar 51 and a first molar 53, whereas the second indent may be arranged between the first molar 53 and the second molar 55.

As explained before, the indents are compressed when the segmentary shell is fitted to the segment of teeth. The first indent on the labial side and the second indent on the lingual side together provide a rotational force on the first molar. A smaller rotational force in the opposite direction may be exerted on the premolar. But since the premolar is in contact with the teeth mesial from it, this rotational force will not lead to an actual noticeable rotation of the premolar. The second molar might undergo a small rotational movement, but this potential movement is less important in the treatment of the malocclusion than a correct rotational position of the first molar.

In a method of treatment, a scan or photos of teeth of patient may be made so that an original situation of the teeth may be registered. Based on the malocclusion, a treatment plan may be devised for the teeth to reach a final desired position. The final desired position may effectively be a final stage of a treatment. However, in other examples, the final stage of a first treatment of the segment may be the begin stage for another treatment. For example, a first treatment may start with a class II malocclusion, whereas the treatment of the segment ends with a class I malocclusion. A second treatment may include traditional brackets, or shells covering a complete arch such as for example Invisalign®.

The method includes fitting a shell to a segment of teeth in a posterior lateral sector, and applying a distal force to the segment of teeth without transferring the distal force to other teeth. The whole treatment may be done with a single shell. In other examples, a number of intermediate situations between the original situation and the final desired situation may be determined. These intermediate situations may be calculated based on a computer model of the patient's teeth. A series of consecutive shells may be manufactured, wherein consecutive shells substantially correspond to the intermediate situations. Each of the consecutive shell segments may be worn by a patient during a period of time, e.g. a week, or two weeks. After the period of time has passed, a shell is substituted by a consecutive shell corresponding to the next intermediate situation.

Each of the shells can apply corrective forces to the segment of teeth, independent from the distalizing forces applied by a traction element, e.g. an elastic band. Preferably, in a first stage of treatment, only distal forces are applied to the canine, and premolars. Rotational forces may only be applied to the (first) molar.

In some examples, one or more shells of the series of shells are configured to apply a rotational force to a (first) molar around a palatal root of the molar. The rotational force may be provided by an indent as discussed before, or by including in the series of consecutive shells a progressing rotational movement of the molar. This has been schematically illustrated in FIG. 4. A plurality of shells with increased rotation of molar 33 may be provided. Whereas the uninterrupted line may indicate a first segmentary shell, the interrupted line indicates a segmentary shell 10B further along in the treatment.

In an aspect of the present disclosure, a treatment may involve the use of several rubber bands to vary the amount of force exerted. However the elastic element may have any other configuration suitable for its purpose, the elastic element could also be formed by a spring, a wire or any other suitable element.

Figure 5A:
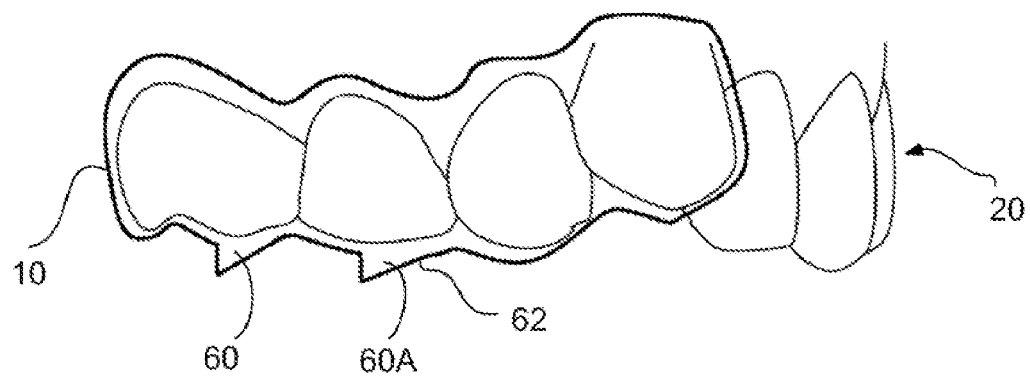
FIGS. 5a-5d schematically illustrate further examples of orthodontic systems comprising a segmentary shell and a complete shell having protrusions.

FIG. 5a schematically illustrates an example of a segmentary shell according to a further aspect of the present disclosure. The segmentary shell 10 is shown to be fitted over a segment of teeth in the maxilla 20. In this example, the segmentary shell comprises first protrusions 60 and 60A. Both these protrusions in this example have a sloping (i.e. inclined surface). Such protrusions 60 and 60A may be contacted by corresponding second protrusions on a shell in the mandible, as will be illustrated in FIGS. 5b-5d showing cross-sectional views of segmentary and complete shells.

Figure 5B:
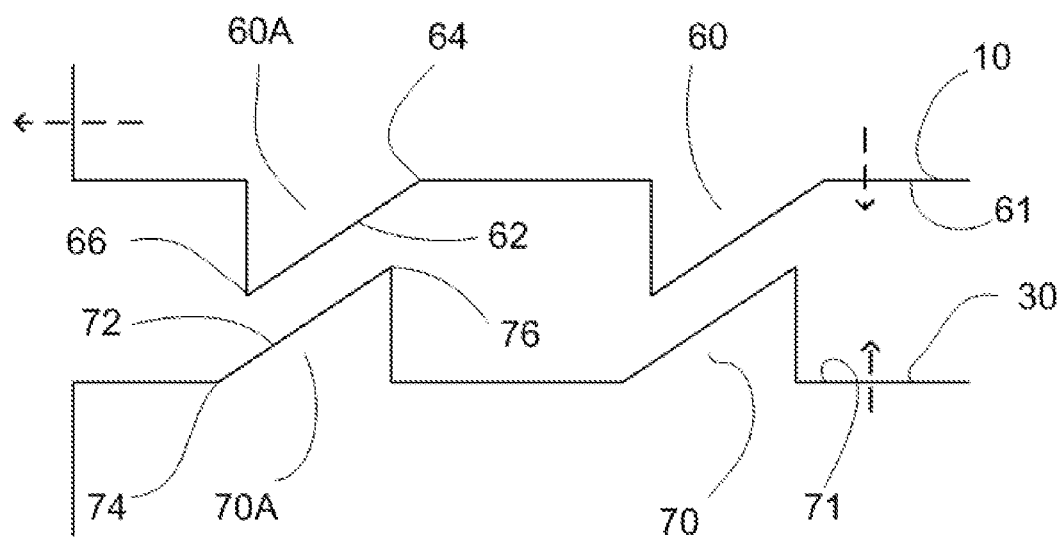
Figure 5C:
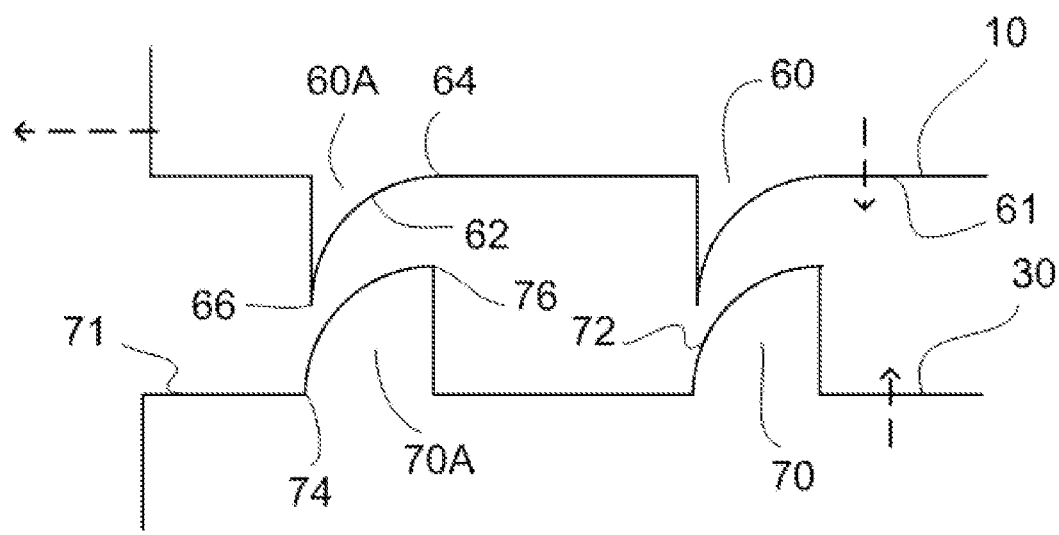
Figure 5D:
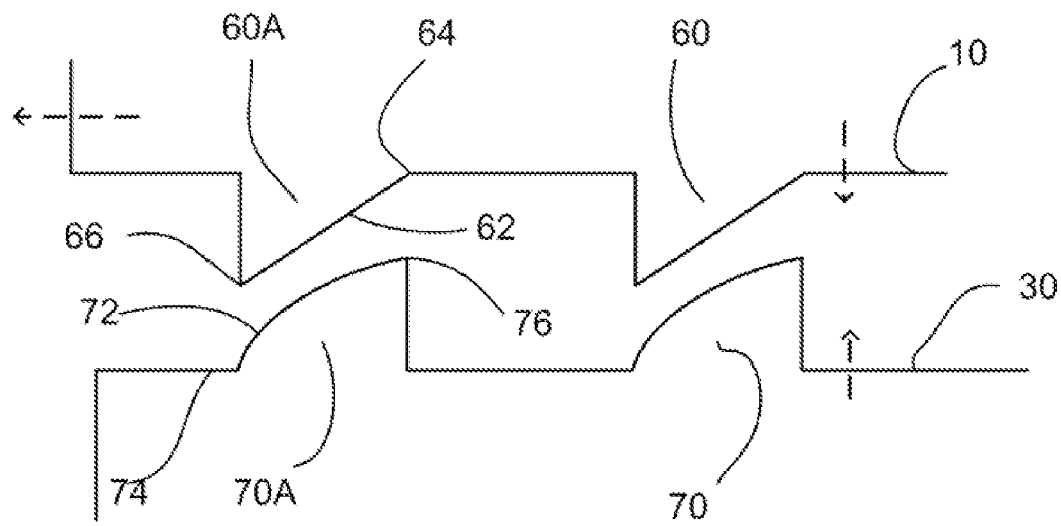

In the example of FIG. 5b, segmentary shell 10 has protrusions 60 and 60A extending from an occlusal surface 61. The occlusal surface 61 of the segmentary shell in use faces the occlusal surface 71 of complete shell 30. The protrusions 60 and 60A have a sloping surface 62 which in this case is substantially straight and flat, i.e. of constant inclination. The sloping surface extends from a base at the occlusal surface 61 towards a top edge 66, i.e. an edge closer to the mandible. The top edge is located more distal than the base.

In this example, the sloping surface 72 of the protrusions 70 and 70A have a substantially complementary shape to the sloping surfaces 62 of the protrusions 60 and 60A, i.e. the sloping surfaces fit well on top of each other. The sloping surface 72 is also substantially straight and extends from a base 74 at the occlusal surface to the top edge 76, i.e. closer to the maxilla. The top edge is located more mesial than the base.

When a patient wears the segmentary shell and the complete shell, the protrusions will repeatedly enter into contact as a patient opens and closes his/her mouth (indicated with arrows on the right hand side of the figure). Whenever contact is established, the second protrusions exert a distalization force (indicated with an arrow on the left hand side of the figure) onto the first protrusions and thereby to the segment of teeth in the maxilla.

Since the complete fixating shell covers a complete arch of the mandible from behind the last molar to before the front surface of the incisors, the teeth in the mandible will not perform a mesial movement.

As illustrated in FIG. 5b, in some examples, the top edge of the second protrusions may be located slightly distally with respect to the base of the first protrusions. Similarly, the base of the second protrusions may be located slightly distally with respect to the top of the first protrusions. The relative displacement of the first protrusions with respect to second protrusions allows a relative sliding movement of a pair of first and second protrusions as the patient closes his/her mouth during which the second protrusions move (relatively) in a mesial direction and the first protrusions move in a distal direction.

FIG. 5c illustrates a further example of a segmentary shell and a complete fixating shell with first and second protrusions respectively. The functioning of the shells and the protrusions may generally be similar to the example explained in FIG. 5c. However in the example of FIG. 5c, the first and second protrusions do not have substantially straight/flat sloping surfaces. Rather, one or more of the first protrusions 60, 60A may be substantially concave. One or more of the second protrusions 70, 70A have sloping surfaces 72 that are substantially convex.

The concavities and convexities in this example are shaped as part circular sectors, and the sloping surfaces are substantially complementary but the present disclosure is not limited in that way. The second protrusions in this example are again arranged slightly distally with respect to the first protrusions so that the protrusions can move horizontally relative to each other as the patient closes or opens his/her mouth.

In further non-illustrated examples, the first and the second protrusions may both be convex.

It should be clear that not all the first protrusions have to have the same shape. Similarly, not all the second protrusions have to have the same shape necessarily. For example, a segmentary shell might include one or more of the first protrusions as shown in FIG. 5b and one or more protrusions as shown in FIG. 5c. Similarly, the complete shell might include second protrusions as shown in FIG. 5b and one or more second protrusions as shown in FIG. 5c.

FIG. 5d schematically illustrates yet a further example. In this example, the first and second protrusions do not have complementary surfaces. The first protrusions have sloping surfaces that are substantially straight, and the second protrusions are substantially curved, and in particular convex. The second protrusions 70, 70A can "roll" over the first protrusions 60, 60A as they enter into contact, thereby providing a distlization force onto the first protrusions, the segmentary shell, and thus the segment of teeth.

Even though in all examples of FIGS. 5a-5d, the segmentary shell is provided in the maxilla and the complete fixating shell is provided in the mandible, and this arrangement is particularly suitable for treating a class II malocclusion. Instead for treating a class III malocclusion, the segmentary shell may be provided in the mandible, and the complete shell may be provided in the maxilla. A distalization force may be provided onto the segmentary shell. The shapes of the protrusions might be mirrored as to the shapes shown in the previous figures. In particular, the base of a sloping surface may be arranged mesially with respect to a top edge of a sloping surface.

In any of the orthodontic systems, devices and methods disclosed herein, a treatment may in some examples be asymmetric, focusing only on either a right side or a left side of the mouth of a patient.

For reasons of completeness, various aspects of the present disclosure set out in the following numbered clauses:

Clause 1. An orthodontic system comprising:
a removable segmentary shell for being fitted on a segment of teeth in a posterior lateral sector, the segment of teeth comprising between two and six adjacent teeth and extending from a canine or premolar to a premolar or molar; and
a resilient traction element, wherein
either the segment of teeth or the removable segmentary shell comprises a labial retention feature configured to be coupled with the traction element; and wherein the orthodontic system is configured to apply distal forces to the segment of teeth, without transferring the distal forces to other teeth outside the segment.

Clause 2. The orthodontic system according to clause 1, wherein the segmentary shell comprises an opening, and a tooth of the segment of teeth comprises the labial retention feature for receiving the resilient traction element, wherein the retention feature optionally is a hook.

Clause 3. The orthodontic system according to claim 1, wherein the shell comprises the labial retention feature for receiving the resilient traction element, wherein the retention feature optionally is a hook.

Clause 4. The orthodontic system according to any of clauses 1-3, further comprising an anchor for receiving the resilient traction element.

Clause 5. The orthodontic system according to clause 4, wherein the anchor is a bracket configured for mounting on a tooth.

Clause 6. The orthodontic system according to any of clauses 1-5, wherein the segmentary shell comprises a first unilateral indent between a first pair of teeth of the segment, wherein the first indent is oversized with respect to a space between the first pair of teeth, such that the first indent is compressed when the shell is positioned on the segment of teeth.

Clause 7. The orthodontic system according to clause 6, wherein the first unilateral indent is an indent on a labial side.

Clause 8. The orthodontic system according to clause 6 or 7, wherein the first pair of teeth of the segment include a premolar and a first molar.

Clause 9. The orthodontic system according to any of clauses 6-8, wherein the segmentary shell comprises a second unilateral indent on a side opposite to the unilateral indent and between a second pair of teeth of the segment, wherein the second indent is oversized with respect to a space between the second pair of teeth, such that the second indent is compressed when the shell is positioned on the segment of teeth.

Clause 10. The orthodontic system according to clause 9, wherein the second pair of teeth of the segment are a first molar and a second molar.

Clause 11. The orthodontic system according to any of clauses 1-10, further comprising a fixating complete shell covering a complete dental arch of either the maxilla or mandible.

Clause 12. The orthodontic system according to clause 11, wherein the fixating complete shell includes a hook for receiving the resilient traction element.

Clause 13. The orthodontic system according to any of clauses 1-12, wherein the resilient traction element is an elastic band.

Clause 14. The orthodontic system according to any of clauses 1-13, comprising a series of consecutive segmentary shells, wherein the segmentary shells are configured to apply a corrective distal force to the segment of teeth, and wherein the consecutive segmentary shells of the series are shaped to correspond to consecutive positions of the segment of teeth in a desired treatment.

Clause 15. The orthodontic system according to clause 14, wherein the series of consecutive segmentary shells substantially do not apply corrective forces other than distal forces to canine or premolars.

Clause 16. The orthodontic system according to clause 14, wherein one or more shells of the series of segmentary shells are configured to apply a rotational force to a molar around a palatal root of the molar, wherein optionally the molar is a first molar.

Clause 17. The orthodontic system according to any of clauses 1-16, wherein the segment extends from a canine to a molar.

Clause 18. The orthodontic system according to any of clauses 1-16, wherein the segment extends from a premolar to a molar.

Clause 19. The orthodontic system according to any of clauses 1-18, wherein the segmentary shell is substantially transparent or translucent.

Clause 20. A method for treating a malocclusion, including
fitting a removable segmentary shell to a segment of teeth in a posterior lateral sector, the segment of teeth comprising between two and six adjacent teeth and extending from a canine or premolar to a premolar or molar,
applying a distal force to the segment of teeth without transferring the distal force to other teeth outside the segment.

Clause 21. The method according to clause 20, wherein applying a distal force includes providing a resilient traction element between an anchor and the segmentary shell or an attachment bonded to a tooth of the segment of teeth.

Clause 22. The method according to clause 21, wherein the segmentary shell comprises an opening, and a tooth of the segment of teeth comprises a retention feature for receiving the resilient traction element, wherein the retention feature optionally is a hook.

Clause 23. The method according to clause 21, wherein the segmentary shell comprises a retention feature for receiving the resilient traction element, wherein the retention feature optionally is a hook.

Clause 24. The method according to any of clauses 21-23, wherein the anchor is a bracket mounted on a tooth, or a temporary anchorage device.

Clause 25. The method according to any of clauses 20-24, further comprising fitting a fixating complete shell covering a complete dental arch of a jaw in which the segmentary shell is not fitted.

Clause 26. The method according to clause 25, wherein the fixating complete shell includes a hook for receiving the resilient traction element.

Clause 27. The method according to any of clauses 20-26, wherein the resilient traction element is an elastic band.

Clause 28. The method according to any of clauses 20-27, wherein the segmentary shell comprises a first unilateral indent between a first pair teeth of the segment, wherein the first indent is oversized with respect to a space between the first pair of teeth, such that the first indent is compressed when the shell is positioned on the segment of teeth.

Clause 29. The method according to clause 28, wherein the first indent is an indent on a labial side.

Clause 30. The method according to clause 25 or 26, wherein the first pair of teeth include a premolar and the first molar.

Clause 31. The method according to any of clauses 28-30, wherein the segmentary shell comprises a second unilateral indent on a side opposite to the first unilateral indent and between a second pair of teeth of the segment, wherein the second indent is oversized with respect to a space between the pair of teeth, such that the second indent is compressed when the shell is positioned on the segment of teeth.

Clause 32. The method according to clause 31, wherein the second pair of teeth of the segment are a first molar and a second molar.

Clause 33. The method according to any of clauses 20-32, comprising
providing a series of consecutive segmentary shells,
fitting a first segmentary shell of the series of consecutive segmentary shells to the segment of teeth, applying the distal force to the segment of teeth with the first segmentary shell fitted on the segment of teeth for a first period of time,
replacing the first segmentary shell with a second segmentary shell of the series of consecutive shells to the segment of teeth and applying the distal force to the segment of teeth with the second segmentary shell fitted on the segment of teeth for a second period of time.

Clause 34. The method according to clause 33, wherein the consecutive segmentary shells are shaped to correspond to consecutive positions of the segment of teeth in a desired treatment.

Clause 35. The method according to clause 33 or 34, wherein the consecutive segmentary shells are configured to apply a corrective distal force to the segment of teeth.

Clause 36. The method according to clause 35, wherein the series of consecutive segmentary shells substantially do not apply corrective forces other than distal forces to canine or premolars.

Clause 37. The method according to clause 35 or 36, wherein one or more segmentary shells of the series of shells are configured to apply a rotational force to a molar around a palatal root of the molar.

Clause 38. An orthodontic system comprising
a segmentary shell configured to cover a segment of teeth in a posterior lateral sector of either a maxilla or a mandible,
a complete fixating shell configured to fit over an arch of teeth of the other of the maxilla and the mandible,
wherein the segmentary shell has a first surface and the complete fixating shell has a corresponding second surface,
wherein the first surface comprises one or more first protrusions
and the second surface comprises one or more second protrusions,
wherein the first and second protrusions are shaped such that when the first and second protrusions enter into contact, the second protrusions provide a distalization force to the first protrusions.

Clause 39. An orthodontic system according to clause 38, wherein the first surface is an occlusal surface of the segmentary shell and the second surface is an occlusal surface of the complete fixating shell facing the first surface.

Clause 40. An orthodontic system according to clause 38 or 39, wherein the first surface is a lingual surface of the segmentary shell and the second surface is a lingual surface of the complete fixating shell.

Clause 41. An orthodontic system according to any of clauses 38-40, wherein the first surface is a labial surface of the segmentary shell and the second surface is a labial surface of the complete fixating shell.

Clause 42. An orthodontic system according to any of clauses 38-41, wherein the first protrusions have a first sloping surface extending between a first base and a first top edge, the first top edge being located distally with respect to the first base.

Clause 43. An orthodontic system according to any of clauses 38-42, wherein the second protrusions have a second sloping surface extending between a second base and a second top edge, the second top edge being located mesially with respect to the second base.

Clause 44. An orthodontic system according to clause 42 and 43, wherein the first sloping surface and the second sloping surface are substantially complementary to each other.

Clause 45. An orthodontic system according to clause 44, wherein the second top edge is distally displaced with respect to the first base.

Clause 46. An orthodontic system according to clause 44 or 45, wherein the first sloping surface and the second sloping surface are substantially straight.

Clause 47. An orthodontic system according to clause 44 or 45, wherein the first sloping surface is substantially concave, and the second sloping surface is substantially convex.

Clause 48. An orthodontic system according to clause 44 or 45, wherein the second sloping surface is substantially concave, and the first sloping surface is substantially convex.

Clause 49. An orthodontic system according to any of clauses 38-48, wherein the segmentary shell or the segment of teeth comprises a first retention feature for receiving a first end of a resilient traction element, the orthodontic system further comprising an anchor for receiving a second end of the resilient traction element, wherein the first retention feature optionally is a hook.

Clause 50. The orthodontic system according to any of clauses 38-49, comprising a series of consecutive segmentary shells, wherein the segmentary shells are configured to apply a corrective distal force to the segment of teeth, and wherein the consecutive segmentary shells of the series are shaped to correspond to consecutive positions of the segment of teeth in a desired treatment.

Clause 51. The orthodontic system according to clause 50, wherein the series of consecutive segmentary shells substantially do not apply corrective forces other than distal forces to canine or premolars.

Clause 52. The orthodontic system according to clause 50 or 51, further comprising a series of complete fixating shells with varying positions of second protrusions.

Clause 53. The orthodontic system according to any of clauses 38-52, wherein the segment extends from a canine to a molar.

Clause 54. The orthodontic system according to any of clauses 38-53, wherein the segment extends from a premolar to a molar.

Clause 55. A removable segmentary shell for being fitted on a segment of teeth in a posterior lateral sector of a maxilla, the segment of teeth comprising between two and six adjacent teeth and extending from a canine or premolar to a premolar or molar, wherein the segmentary shell comprises one or more protrusions having a sloping surface extending between a base, and a top edge, the top edge being located closer to the mandible than the base, wherein the top edge is located distally with respect to the base.

Clause 56. A removable segmentary shell according to clause 55, wherein the sloping surface is substantially straight.

Clause 57. A removable segmentary shell according to clause 55, wherein the sloping surface is substantially concave.

Clause 58. A removable segmentary shell according to clause 55, wherein the sloping surface is substantially convex.

Clause 59. A removable segmentary shell according to any of clauses 55-58, wherein the protrusions are provided on an occlusal surface of the segmentary shell.

Clause 60. A removable segmentary shell according to any of clauses 55-58, wherein the protrusions are provided on a labial surface of the segmentary shell.

Clause 61. A removable segmentary shell according to any of clauses 55-58, wherein the protrusions are provided on a lingual surface of the segmentary shell.

Clause 62. A removable segmentary shell for being fitted on a segment of teeth in a posterior lateral sector of the mandible, the segment of teeth comprising between two and six adjacent teeth and extending from a canine or premolar to a premolar or molar, wherein the segmentary shell comprises one or more protrusions having a sloping surface extending between a base, and a top edge, the top edge being located closer to the maxilla than the base, wherein
the top edge is located distally with respect to the base.

Clause 63. A method for treating a malocclusion, including
fitting a removable segmentary shell to a segment of teeth in a posterior lateral sector of a maxilla or mandible, the segment of teeth comprising between two and six adjacent teeth and extending from a canine or premolar to a premolar or molar,
fitting a complete fixating shell configured to fit over an arch of teeth of the other of the maxilla and the mandible,
wherein the segmentary shell has a first surface and the complete fixating shell has a corresponding second surface, wherein the first surface comprises one or more first protrusions
and the second surface comprises one or more second protrusions,
wherein the first and second protrusions are shaped such that when the first and second protrusions enter into contact, the second protrusions provide a distalization force to the first protrusions.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for treating a malocclusion, comprising:
providing a series of consecutive left segmentary shells,
providing a series of consecutive right segmentary shells,
fitting a first left segmentary shell of the series of left consecutive segmentary shells to a left segment of teeth in a left posterior lateral sector of one of a maxilla and a mandible,
fitting a left anchor on a tooth on a left side of the other of the maxilla and mandible,
fitting a first right segmentary shell of the series of right consecutive segmentary shells to a right segment of teeth of a right posterior lateral sector of one of the maxilla and the mandible, and
fitting a right anchor on a tooth on a right side of the other of the maxilla and mandible,
the left and right segments of teeth comprising between two and six adjacent teeth and extending from a canine or premolar to a premolar or molar of the left and right segments of teeth, wherein
there is no connection between the left and right first segmentary shells, and
applying a distal force to the left and right segments of teeth with the first left and right segmentary shells fitted on the left and right segments of teeth respectively for a first period of time by providing a left and right resilient traction element between the left and right anchors and the left and right segmentary shells respectively or a retention feature bonded to a tooth of the left and right segments of teeth respectively,
replacing the first left and right segmentary shells with second left and right segmentary shells of the series of left and right consecutive shells and applying distal force to the left and right segments of teeth with the second segmentary shells fitted on the left and right segments of teeth respectively for a second period of time, and wherein
the series of consecutive left and right segmentary shells do not apply corrective forces other than distal forces to the canine and the premolar.

2. The method according to claim 1, wherein the left and right segmentary shells comprise an opening and a tooth of each of the left and right segments of teeth comprises the retention feature for receiving the resilient traction element, wherein the retention feature is a hook and extends through the opening or wherein the left and right resilient traction element is provided between the left and right anchors and the left and right segmentary shells.

3. The method according to claim 1, wherein the left or right anchor is a bracket mounted on a molar in the other of the mandible and maxilla.

4. The method according to claim 1, wherein the left or right anchor is a temporary anchorage device.

5. The method according to claim 1, further comprising fitting a fixating complete shell covering a complete dental arch of the other of mandible and maxilla.

6. The method according to claim 1, wherein the left and right resilient traction elements are elastic bands.

7. The method according to claim 1, wherein the consecutive left and right segmentary shells are shaped to correspond to consecutive positions of the left and right segments of teeth in a desired treatment.

8. A method for treating a malocclusion of a patient comprising:
a first treatment for treating a class II malocclusion to arrive at a class I malocclusion, and
a second treatment for resolving the class I malocclusion, wherein the first treatment comprises:
providing a series of consecutive segmentary shells,
fitting a first segmentary shell of the series of consecutive segmentary shells to a segment of teeth in a posterior lateral sector of a maxilla, the segment of teeth comprising between two and six adjacent teeth and extending from a canine or premolar to a premolar or molar the segment of teeth,
fitting an anchor in a mandible,
applying a distal force to the segment of teeth with the first segmentary shell fitted on the segment of teeth for a first period of time by providing a resilient traction element between the anchor and the segmentary shell or an attachment bonded to a tooth of the segment of teeth,
replacing the first segmentary shell with a second segmentary shell of the series of consecutive shells to the segment of teeth and applying a distal force to the segment of teeth with the second segmentary shell fitted on the segment of teeth for a second period of time, and
removing the second segmentary shell after the second period of time, wherein during the first treatment, the first and second segmentary shells only apply distal forces to the segment of teeth in the posterior lateral sector of the maxilla, wherein the second treatment comprises providing a series of complete shells for the maxilla, wherein the complete shells are shaped to correspond to consecutive positions of the teeth of the maxilla in the second treatment, and wherein the first and second segmentary shells provide the distal forces only to the segment of teeth in the posterior lateral sector.

9. The method according to claim 8, comprising fitting a first of the complete shells to the maxilla for a first period of time, and subsequently fitting further complete shells for consecutive periods of time.

10. The method according to claim 8, further comprising, before the first treatment, making a scan or photos of teeth of the patient to determine an original situation of the malocclusion of the patient.

* * * * *